June 21, 1960
J. R. FURRER
2,941,482
TWO-WHEELED VEHICLE TRUCK
Filed Feb. 10, 1955
5 Sheets-Sheet 1
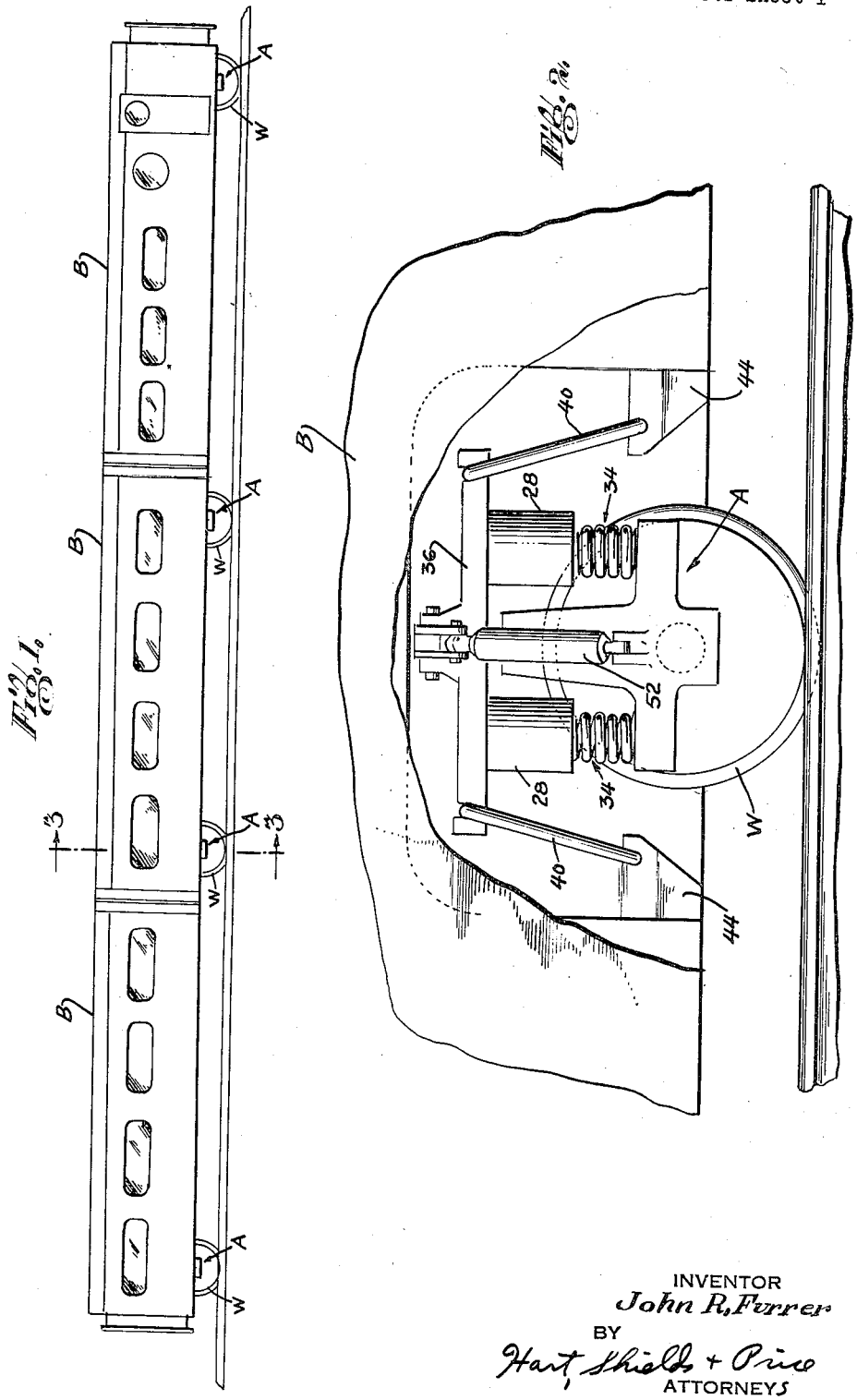
INVENTOR
John R. Furrer
BY
Hart, Shields + Price
ATTORNEYS

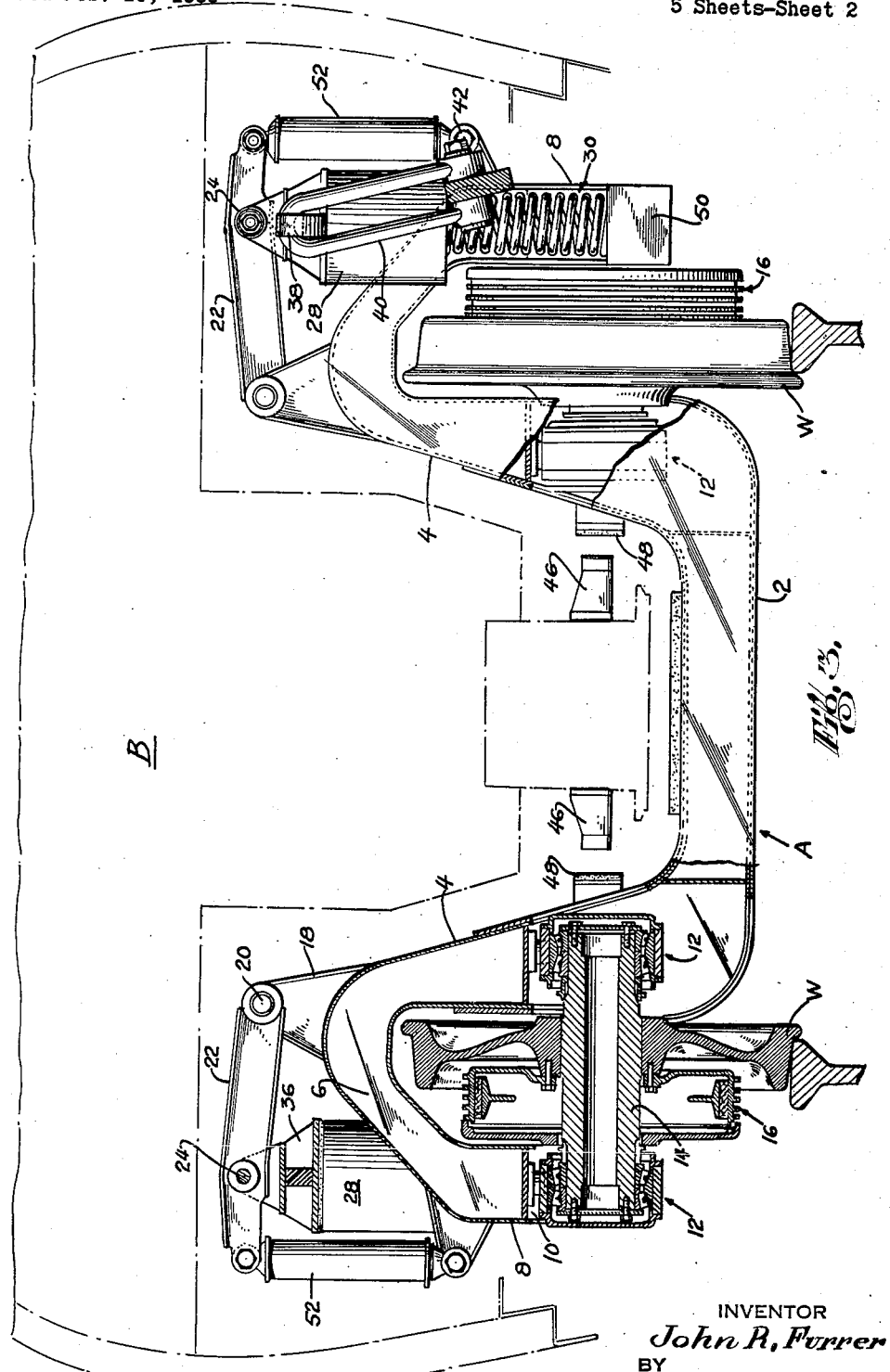

June 21, 1960  J. R. FURRER  2,941,482
TWO-WHEELED VEHICLE TRUCK
Filed Feb. 10, 1955  5 Sheets-Sheet 3
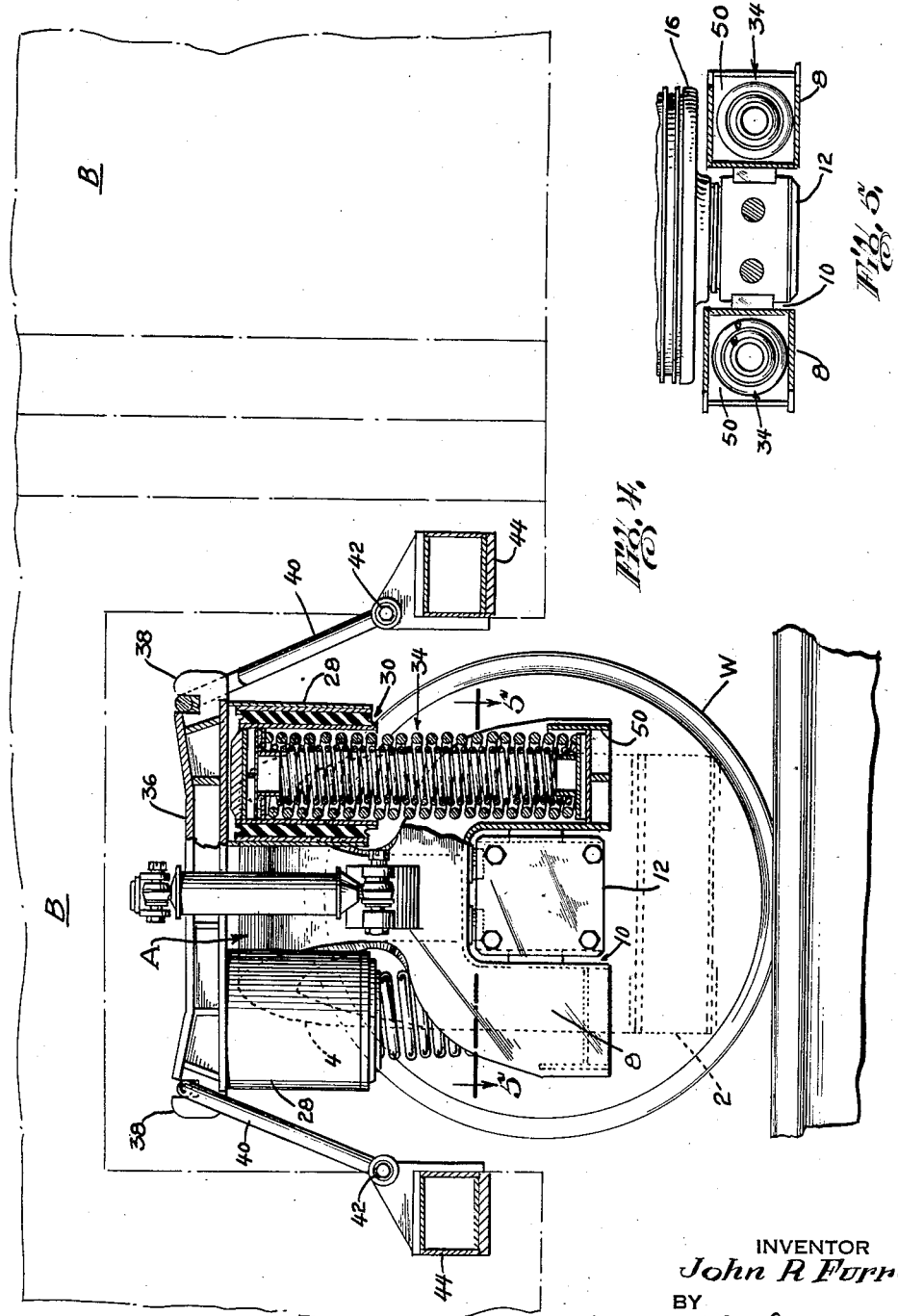
INVENTOR
John R. Furrer
BY
Hart, Shields + Price
ATTORNEYS

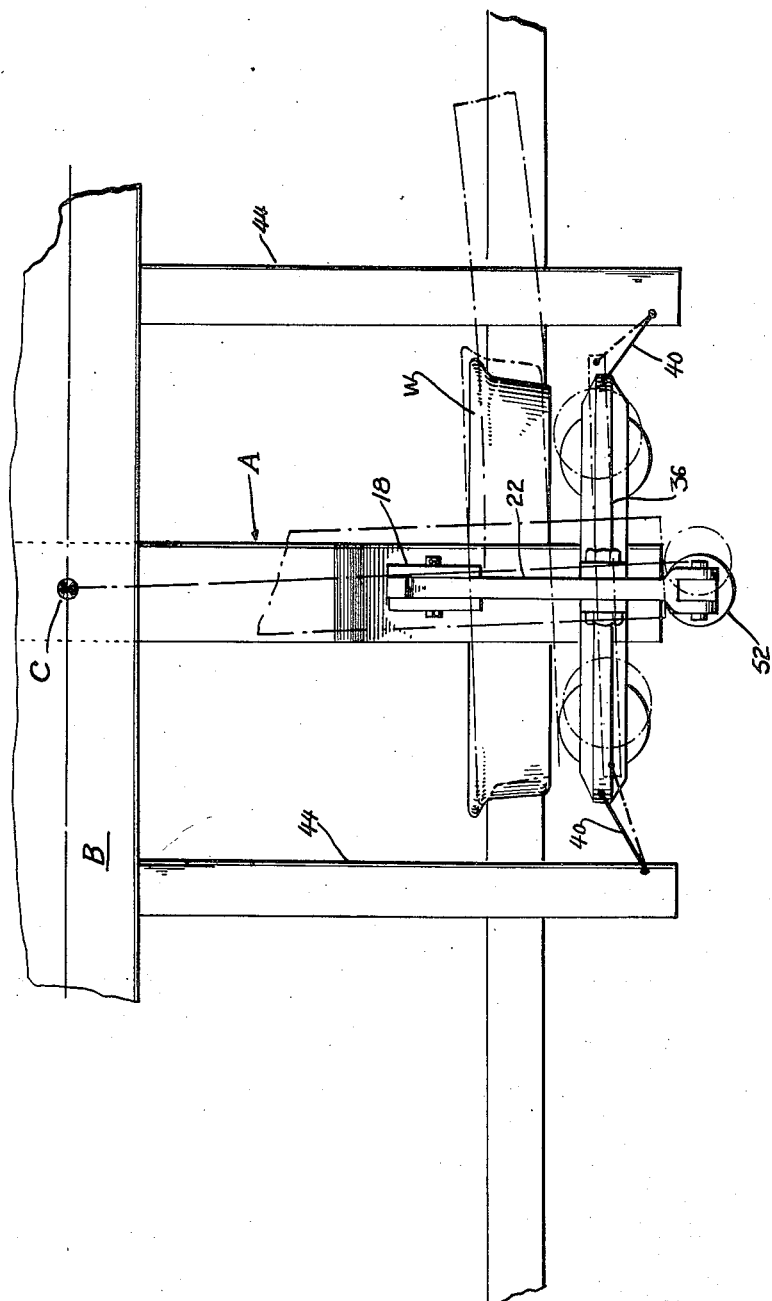

June 21, 1960
J. R. FURRER
2,941,482
TWO-WHEELED VEHICLE TRUCK
Filed Feb. 10, 1955
5 Sheets-Sheet 5
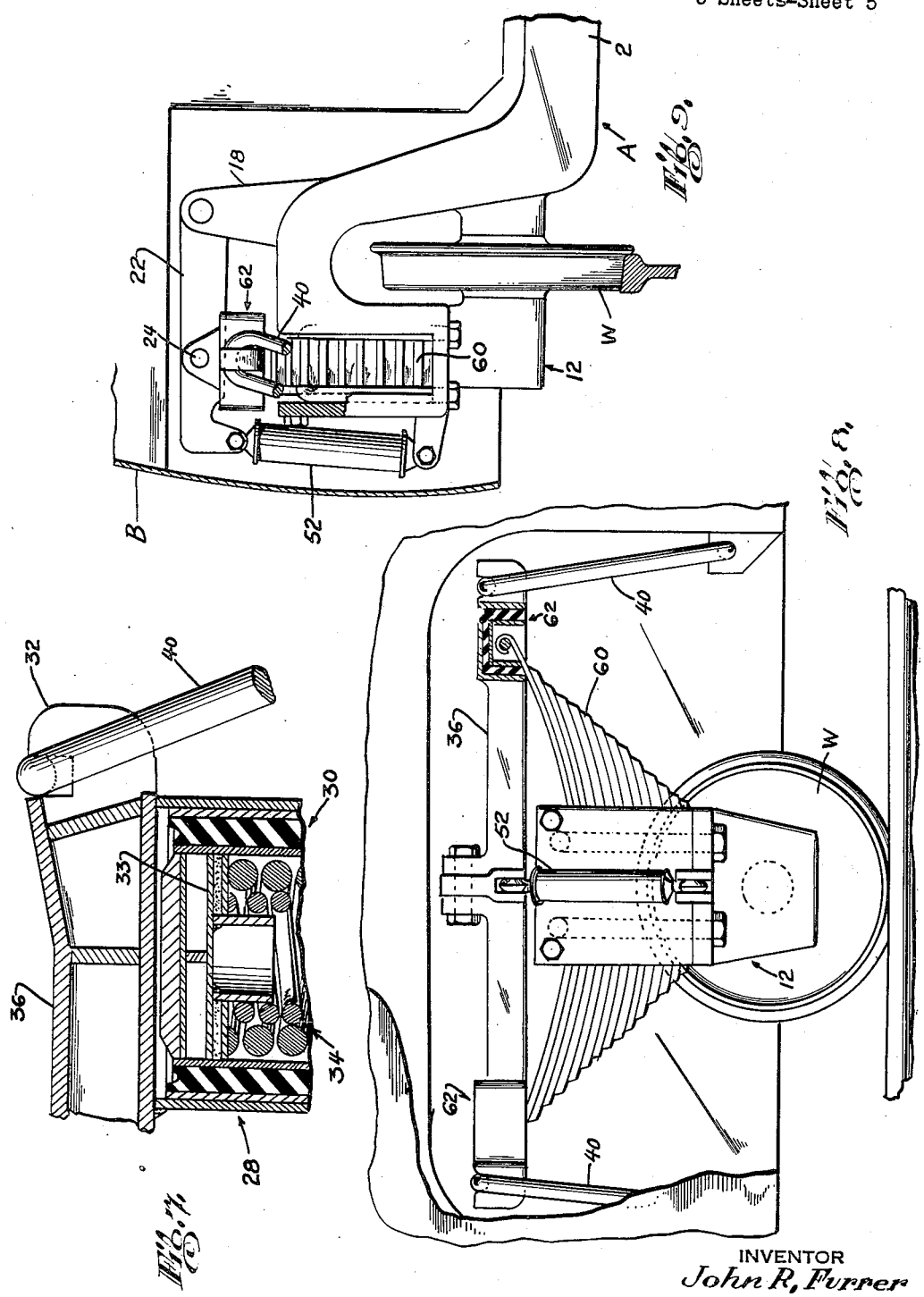
INVENTOR
John R. Furrer
BY
Hart, Shields + Price
ATTORNEYS

United States Patent Office 2,941,482
Patented June 21, 1960

2,941,482

TWO-WHEELED VEHICLE TRUCK

John R. Furrer, Bronxville, N.Y., assignor to ACF Industries, Incorporated, New York, N.Y., a corporation of New Jersey Filed Feb. 10, 1955, Ser. No. 487,329

16 Claims. (Cl. 105—169)

This invention relates to vehicles in general, but in particular to lightweight railway vehicles supported on two-wheeled trucks.

Railway vehicles, as constructed in the past have been comprised of heavy bodies supported on heavy trucks. The trucks, in many instances, comprising one-quarter of the total weight of the car.

It is an object of the present invention to provide a lightweight vehicle in which parts are mutually supported and adapted to run on light two-wheeled trucks.

A further object of the invention is the provision of a railway vehicle supported on two-wheeled trucks by suspension means which eliminate any center bearing with its consequent friction.

A still further object of the invention is the provision of a railway vehicle supported on two-wheeled trucks with the body extending downward between the wheels and suspended on the truck by swing links mounted outside the wheels.

These and other objects of the invention will be apparent from the following description and accompanying drawings in which:

Fig. 1 is an elevational view of a three-part railway vehicle.

Fig. 2 is an elevational view with parts broken away to better disclose the vehicle suspension.

Fig. 3 is a sectional view taken substantially on line 3—3 of Fig. 1.

Fig. 4 is a partial end view and partial sectional view showing the suspension.

Fig. 5 is a sectional view taken substantially on line 5—5 of Fig. 4.

Fig. 6 is a plan view showing the relation of parts on straight and curved tracks.

Fig. 7 is an enlarged fragmentary view showing the upper end of the spring mount.

Fig. 8 is an end view similar to Fig. 2 but showing a modification, and

Fig. 9 is a sectional view similar to Fig. 3 but showing the modification of Fig. 8.

Referring now to the drawings in detail it will be seen that the vehicle is supported on wheels W and is made up of three body parts B carried on the wheels by means of the axle frame A. As shown, in Fig. 1, the end body parts have their extreme ends supported on two wheels while the inner ends are supported on the ends of the center unit riding on two two-wheeled trucks. In other words the three unit body is supported by four two-wheeled trucks.

As more clearly shown in Figures 2, 3 and 4, the axle frame A is formed with a dropped center portion 2 merging into upwardly directed inner sides 4 which at their upper ends are directed or arched outwardly then downwardly, as at 6, to encase the wheels W. The inner sides 4 and vertical outer sides 8 of the axle frame are provided with aligned openings 10 adapted to receive journal boxes 12. These journal boxes are supported on the ends of stub axles 14 preferably made hollow to lighten the same and these axles have pressed or otherwise secured thereon the wheels W. These wheels may be of any desired construction and may, as in Figure 3, carry brake drums 16. The openings 10 permit the complete downward removal of the preassembled wheels, axles and journal box assemblies which normally may be retained in the openings by any suitable securing means (not shown). The axle frame adjacent the upper portion and above the wheels in provided with upstanding ears 18 pierced at their upper ends to receive a pin 20 upon which the inner end of rocker arm 22 is pivoted. The ears and rocker arms are in close engagement so as to prevent any relative movement other than rotation about pivot pin 20. Intermediate their ends the rocker arms are pierced to receive a pin 24 upon which is pivotally mounted an upper or movable spring support 36. The arm 22 is thus a link by which movable support 36 is connected to the frame. This upper movable spring support, as shown, is formed with two downwardly directed circular pockets 28 within which are secured circular rubber shear units 30 formed of inner and outer plates bonded to rubber or similar material. The inner shear plate has secured thereto, disks 32 forming the support for the upper ends of springs 34. The upper ends of the pockets 28 are joined by the rigid structure 36 pivoted at its center on pin 24 previously referred to and formed at its outer ends with ears 38 adapted to receive swing links 40 supporting the car body. These swing links are inclined downwardly and outwardly with respect to the wheel in both the transverse and longitudinal directions, as clearly shown in Figures 3 and 4. The lower ends of links 40 are pivotally connected, as at 42, to brackets carried on transverse members 44 of the body B. These pin connections 42, as clearly shown, are located outboard of the wheels and outward of the ends of the axles. This inclination and connection of the links causes the weight of the body to act as centering means tending to hold the truck in both longitudinal and transverse relation with respect to the body while permitting relative longitudinal and transverse movements. As shown in Figure 3, the body has the central portion dropped below the tops of the wheels and is provided with bumper plates or stops 46 adapted to contact bumper plates 48 formed on the upwardly directed sides of the axles frame to limit transverse movements between the truck and body. The lower ends of springs 34 are adapted to be received within and retained by supports 50 formed as part of the outer ends of the axle frame.

As clearly shown, the truck is connected to the body only by the swing links 40 and these, as well as the spring supports 34 and 30, are located outwardly or outboard of the wheels thereby giving great stability to the car body while permitting rotation of the truck with respect to the body about a virtual center C, Figure 6. The parts will assume the line and dash position of Figure 6 when the truck parts enter a curve and it will be seen that the links 40 will tend to restore the truck to its normal position as soon as the vehicle leaves the curve and enters upon tangent track. In order to guide the wheels into the curves and relieve the flanges and rail of friction it is preferable that guiding and controlling mechanism, such as shown in my application 252,113, filed October 19, 1951, be utilized. It is preferable also that the rebound of the springs be controlled and this is accomplished by connecting a damper or snubber 52 between the axle frame and the outer ends of the pivotally mounted member 22.

As shown in Figures 8 and 9, the coil spring arrangement of Figures 2, 3 and 4, can be modified by substituting leaf springs 60 and these leaf springs will be mounted on the axle frame outboard of the wheels and will have their ends connected to the arms 36 by means of combined shear and compression units 62. The action of these units is the same as that previously described and wherever possible the same reference numerals have been applied in order to simplify the description.

While the invention has been described more or less in detail with specific reference to the drawings, it will be obvious that various modifications may be made without departing from the scope of the invention as defined in the following claims.

What is claimed is:

1. In a railway truck, the combination of a pair of wheels, an axle frame carried by the wheels, a fixed spring pocket carried by the frame adjacent each wheel, a movable spring pocket connected to the frame, and spring means interposed between the spring pockets.

2. In a railway truck the combination of a pair of wheels, an axle supported by each wheel, a frame supported on the axles, a fixed spring support mounted on the frame adjacent each wheel, a rocker arm pivotally connected to the frame, a movable spring support pivotally connected to the rocker arm, and spring means interposed between the spring supports and urging them apart.

3. In a railway truck the combination of a pair of wheels, stub axles supported by each wheel, a frame supported on the axles inboard and outboard of the wheels, a fixed spring support carried by the frame adjacent each wheel, a movable spring support connected to the frame adjacent each wheel, and spring means interposed between the adjacent spring supports and urging them apart.

4. The structure of claim 3 characterized in that said fixed and said movable supports are carried outboard of the wheels.

5. The structure of claim 3 characterized in that said fixed supports are located fore and aft of the axles and outboard of the wheels and said movable supports are connected to the frame substantially above the wheels.

6. In a railway truck adapted to support a car body the combination of, a pair of wheels adjacent an end of the body, an axle frame carried by the wheels, a fixed spring support carried by the frame adjacent each wheel, a movable spring support connected to the frame, spring means interposed between the spring supports and urging the same apart, and swing links suspended from the movable spring supports and connected to the body to support the same.

7. In a railway truck adapted to support an end of a car body the combination of, a single pair of wheels adjacent the end of the body, an axle frame carried by the wheels, a fixed spring support carried by the frame adjacent each wheel, a movable spring support adjacent each wheel linkedly connected to the frame, spring means interposed between the adjacent spring supports and urging the same apart, and means suspended from movable spring supports and connected to the body to support the same, said means including swing links inclined longitudinally and transversely of the body and tending to hold said truck centered beneath the body.

8. The structure of claim 7 characterized in that said links are so inclined as to permit rotation of said truck about a virtual center midway of the axle frame.

9. The structure of claim 7 characterized in that said spring supports and links are positioned outboard of the wheels.

10. The structure of claim 7 characterized in that said axle frame has the center thereof dropped below the wheel centers and the body is in part located between the wheels.

11. In a railway truck adapted to support an end of a car body the combination of, a single pair of wheels each adapted to run on a rail, a stub axle supported by each wheel, a frame member arching over each wheel for support on the axles and having the center dropped below the axle plane, fixed spring supports carried by the frame member outwardly of the wheels, movable spring supports connected to the frame member above the fixed supports, spring means interposed between and urging said fixed and movable supports apart, and means depending from said movable supports and connected to the car body to resiliently support the same on said frame member.

12. The structure of claim 11 characterized in that said movable supports have the connection to the frame member located above the adjacent wheel and substantially in the vertical plane of the stub axle.

13. The structure of claim 11 characterized in that the car body is in part located between the wheels and is provided with stops substantially in alignment with the stub axles to limit truck movements transversely of the body.

14. The structure of claim 11 characterized in that said last mentioned means form the sole load carrying means for the end of the body and are connected thereto outwardly of the ends of said axles.

15. In a railway truck adapted to support an end of a car body the combination of, a single pair of wheels adjacent the end of the body, an axle frame carried by the wheels, a fixed spring support carried by the frame adjacent each wheel, a movable spring support adjacent each wheel connected to the frame, spring means interposed between the adjacent spring supports and urging the same apart, and means suspended from the movable spring supports and connected to the body to support the same, said last mentioned means including swing links tending to hold said truck centered beneath the body.

16. In a device according to claim 15, said frame having a pair of upstanding ears, and there being a rocker arm pivotally connected to said ears, and said movable spring support being pivotally connected to said rocker arm.

References Cited in the file of this patent

UNITED STATES PATENTS

| | | |
|---|---|---|
| 2,462,666 | Omar | Feb. 22, 1949 |
| 2,648,536 | Udstad | Aug. 11, 1953 |
| 2,706,453 | Schneider | Apr. 19, 1955 |